Patented Dec. 8, 1936

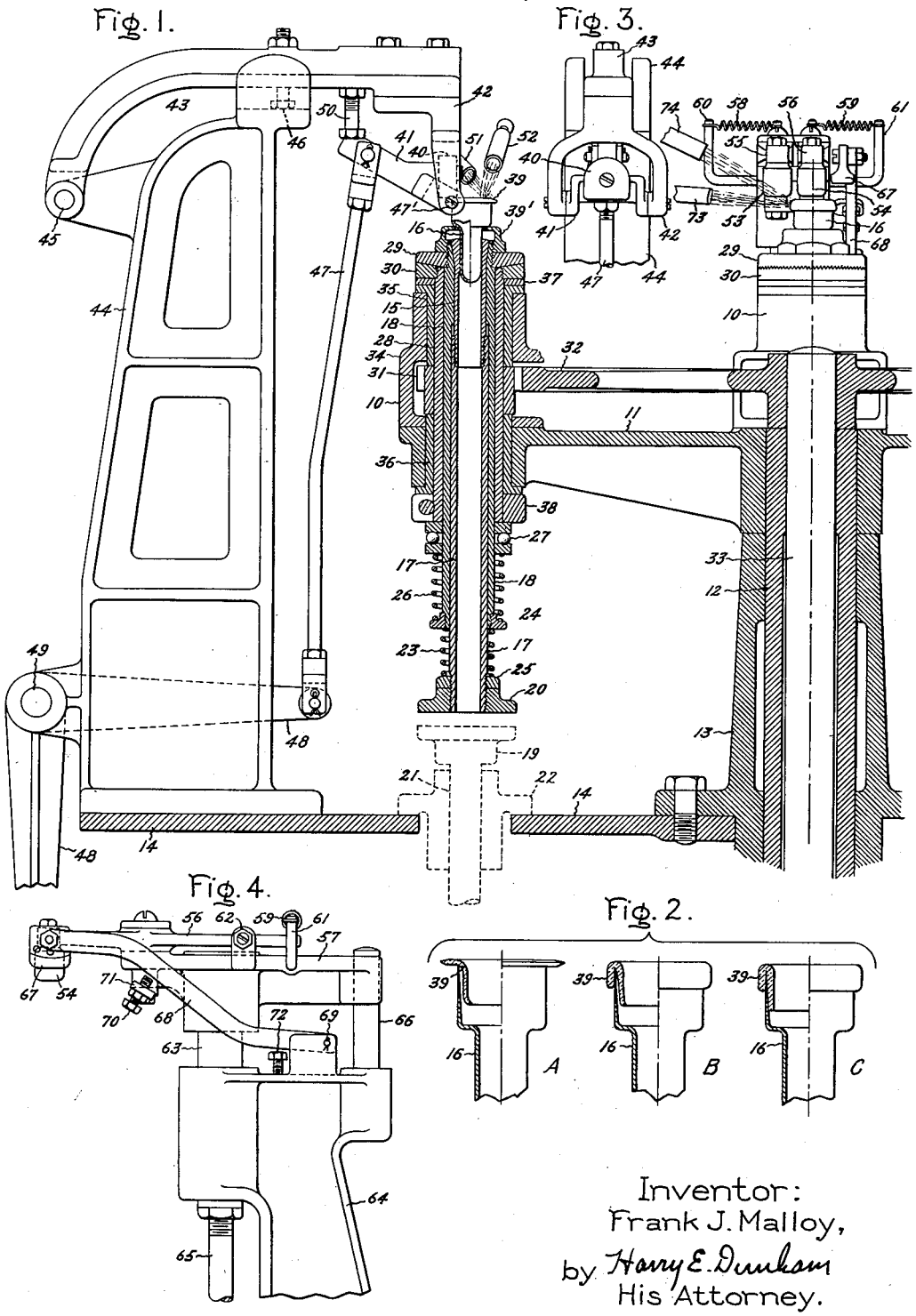

2,063,109

UNITED STATES PATENT OFFICE 2,063,109

APPARATUS FOR MAKING ARTICLES OF METAL AND GLASS

Frank J. Malloy, Cleveland Heights, Ohio, assignor to General Electric Company, a corporation of New York Application January 12, 1935, Serial No. 1,539

4 Claims. (Cl. 49—2)

My invention is a machine for sealing a glass or other vitreous member in the form of a flange or collar to the end portion of a metal tube, the said glass flange or collar being folded over and sealed to both sides of the end portion of the tube.

My invention is particularly useful in the production of electric lamps or similar devices of the type disclosed in U. S. Patent 1,967,852, Daniel K. Wright, issued July 24, 1934, which comprise a glass bulb having outwardly extending metal terminal elements in the form of thimbles, the edges of which are sealed to openings in the walls of the bulb. In constructing these devices, a glass collar is fused to the end of the tube or thimble and this end is then sealed to the walls of an opening in a cup-shaped glass body which is subsequently fused to the neck of a glass bulb or envelope.

One of the objects of this invention is to provide a machine for automatically shaping and fusing the glass flange or collar to the end of the metal tube or thimble. The machine provides uniformly good seals so that when the tube is later fused to the glass bulb or envelope of the lamp or similar device, it ensures a good air-tight metal to glass seal.

Further features and advantages of my invention will appear from the following description of species thereof and from the drawing.

In the drawing, Fig. 1 is a vertical section through a portion of a machine comprising my invention; Fig. 2 is a partially sectional view of a series of steps in making the seal between the metal tube or thimble and the glass collar or flange; Fig. 3 is an end view of a portion of a collar forming mechanism of my machine; and Fig. 4 is a side elevation of mechanism for working the glass collar upon the inner and outer surfaces of the metal tube or thimble.

Referring to Fig. 1, the machine comprises a plurality of heads 10 located at the periphery of a turret 11 which is mounted on a vertical tubular shaft 12. The shaft 12 is mounted in a bracket 13 which is attached to a table 14 and is indexed intermittently by mechanism which is not shown. The heads each comprise a chuck 15 into which the small end of the metal thimble 16 is inserted. The chuck 15 is closed by removal of the supporting means for tube 17 to which said chuck is attached which causes the fingers of said chuck to be pulled down in tube 18 and to be thereby closed upon the end of the thimble. The supporting means for tube 17 is indicated in dotted lines and comprises a collar 19 which is mounted on rod 21 and engages a collar 20 on the end of tube 17. The rod 21 is moved vertically in bracket 22 by cam-operated mechanism (not shown). As the supporting means is withdrawn, a spring 23, which is located between a collar 24 on the end of tube 18 and the nut 25, causes the tube 17 to be moved downward. This movement of tube 17 also relieves the pressure against collar 24 which permits spring 26 to move tube 18 downward. Spring 26 is located between collar 24 and the race of a ball bearing 27 which rides against a tube 28. The downward movement of tube 18 causes notches in collar 29 to engage notches in collar 30 which is attached to tube 28. This movement causes the thimble 16 and chuck 15 to rotate because the said tube 28 is constantly being rotated through the engagement of a gear 31 thereon with a gear 32 which is attached to shaft 33 which in turn is rotated by mechanism not shown. The remaining parts of the turret head comprise a bracket 34 which is attached to the turret 11 and which supports, through bushing 35, the upper end of tube 28. The lower end of said tube 28 is supported by a bushing 36 in the turret 11. A washer 37 is provided between collar 30 and bushing 35. The tube 28 can not move vertically when the chuck is opened because the thrust thereof is taken by bushing 36 which is engaged by a collar 38 clamped to the tube 28. A tubular glass flare 39 is placed upon the upper tapered thin end of the metal thimble 16 as shown at A in Fig. 2 before the head is indexed away from the loading position. The large part of the thimble rests against the inwardly flanged portion of nut 39' which is attached to tube 18.

At positions of the heads 10 subsequent to the loading position, fires are directed onto the outside and inside of the thimble 16 and flare 39. The fires tend to oxidize the surfaces of the thimble and to work the glass flare against the walls thereof. However, at the position at which the head is shown in section, a shoe 40 comes in contact with the flange portion of the flare and folds it down over the outer surface of the end of the thimble as shown at B, Fig. 2. The shoe 40 consists preferably of a block of graphite and, as shown in Figs. 1 and 3, is attached to an arm 41 which is pivotally attached to a yoke 42. The yoke 42 is fastened to an arm 43 which is pivotally attached to a standard 44 by a pin 45. As the head comes into the position at which said shoe 40 is located, the arm 43 is lowered until the shoe comes in contact with the flanged portion of the glass flare. This position of the arm 43 is taken when the head of bolt 46 strikes the standard 44 and is produced by a downward movement of rod 47. The rod is attached to one arm of lever 48 which is turned about a pin 49 extending from the standard by cam operated mechanism (not shown). The rod 47 is also attached to arm 41 which is engaged by a bolt 50 extending from arm 43 and which carries the full weight of the assembly attached to arm 43 until bolt 46 strikes the standard. With the arm 43 in position, further downward movement of rod 47 swings arm 41 about its pivots 47' and carries the shoe 40 down and around the edge of the thimble 16, thereby folding the flange of the flare down along the side thereof. Two burners 51 and 52 are located at this position which are directed against the flange of the flare and the side of the thimble.

At a subsequent position of the head 10 the thimble is brought before another mechanism of the machine shown in Figs. 1 and 4, which presses the glass collar 39 (Fig. 2—B) firmly upon the sides of the thimble. This device comprises a pair of rollers 53 and 54 mounted rotatably on pins in the end of levers 55 and 56 respectively. The said levers are mounted on bracket 57 and are first carried down by said bracket so the rollers 53 and 54 are brought down adjacent the outer and inner surfaces respectively, of the thimble 16. This movement tends to wipe the inner and outer portions of the collar against the metal thimble and to force the air from between the collar and the thimble. The rollers 53 and 54 are pulled toward each other by springs 58 and 59 respectively which extend between posts in the opposite ends of the levers and posts 60 and 61 extending from bracket 57. The rollers move toward each other to firmly work the collar 39 against the surfaces of the thimble 16 as shown in Fig. 2—C, until the movement of the levers 55 and 56 is stopped by screws in the bracket 57. One of the screws 62 is shown in Fig. 4. Bracket 57 is mounted on rod 63 which is moved vertically in standard 64 by rod 65 attached thereto. The said bracket 57 is prevented from turning by a pin 66 extending from said standard 64. Rod 65 is operated by cam mechanism (not shown) and upon being lowered, it causes a flattening shoe 67 to strike the top edge of the glass collar 39. The shoe 67 is attached to arm 68 which is pivotally attached to standard 64 by pin 69 and is used to flatten the top edge of the glass collar and to make it perpendicular to the axis of the thimble. The said shoe 67 comes in contact with the collar 39 when the bracket 57 reaches its lower position since the arm 68 is supported by bolt 70 in the arm 71 extending from bracket 57. The lower limit of movement of the shoe is reached when arm 68 strikes the head of a bolt 72 in the standard 64. During this operation, the glass collar 39 is heated by the flames from burners 73 and 74. The said collar 39 is shown in its final form at C in Fig. 3, being sealed tightly to both the inner and outer surfaces of the end of the thimble 16. The machine provides the glass collar on the thimble free from ripples, air pockets or other irregularities.

What I claim as new and desire to secure by Letters Patent of the United States is:

1. A machine for uniting a glass collar to the end of a metal tube comprising a head for supporting said tube, means for rotating said head about its axis, heating means mounted adjacent said head for heating the end of the metal tube and a glass flare mounted on the end of said tube, a shoe mounted adjacent said head, means for moving said shoe toward said head and along the outer surface of the end of said metal tube whereby it engages a flange portion of said glass flare and folds it against the outer surface of said tube end to form a collar thereon, a pair of cylindrical rollers mounted adjacent each other and also adjacent said head, means for moving said rollers toward said head axially thereof to cause them to engage portions of said glass collar inside and outside of said tube respectively, and means for moving said rollers toward each other to compress said collar portions against said tube.

2. A machine for uniting a glass collar to the end of a metal tube comprising a head for supporting said tube, means for rotating said head about its axis, heating means mounted adjacent said head for heating the end of the metal tube and a glass flare mounted on the end of said tube, a shoe mounted adjacent said head, means for moving said shoe toward said head and along the outer surface of the end of said metal tube whereby it engages a flange portion of said glass flare and folds it against the outer surface of said tube and to form a collar thereon, a pair of cylindrical rollers mounted adjacent each other and also adjacent said head, means for moving said rollers toward said head axially thereof to cause them to engage portions of said glass collar inside and outside of said tube respectively, means for moving said rollers toward each other to compress said collar portions against said tube, a body having a flat surface disposed axially of and adjacent said head, and means for moving said body toward said head to engage the rim of said glass collar in said head to flatten out said rim so that the surface thereof is in a plane substantially perpendicular to the axis of the metal tube.

3. A machine for uniting a glass collar to the end of a metal tube comprising a rotatable turret, means for indexing said turret about a vertical axis, a plurality of vertically disposed heads mounted at the periphery of said turret and each adapted to hold a metal tube having a glass flare placed on the upper end thereof, means for rotating said heads about their axes, burners mounted adjacent the periphery of said turret for heating the ends of said tubes and said glass flares, a shoe mounted adjacent the periphery of said turret at one of the indexing positions thereof, means for moving said shoe down toward a head and along the outer surface of the upper end of said tube whereby it engages a flange portion of said glass flare and folds it down against the outer surface of said tube to form a collar thereon, a pair of cylindrical rollers mounted adjacent each other above the path of travel of said heads at a subsequent indexing position of said turret, means for moving said rollers down toward a head at said position axially thereof to cause them to engage portions of said glass collar inside and outside of said tube respectively, and means for moving said rollers toward each other to compress said collar portions against said tube.

4. A machine for uniting a glass collar to the end of a metal tube comprising a rotatable turret, means for indexing said turret about a vertical axis, a plurality of vertically disposed heads mounted at the periphery of said turret and each adapted to hold a metal tube having a glass flare placed on the upper end thereof, means for rotating said heads about their axes, burners mounted adjacent the periphery of said turret for heating the ends of said tubes and said glass flares, a shoe mounted adjacent the periphery of said turret at one of the indexing positions thereof, means for moving said shoe down toward a head and along the outer surface of the upper end of said tube whereby it engages a flange portion of said glass flare and folds it down against the outer surface of said tube to form a collar thereon, a pair of cylindrical rollers mounted adjacent each other above the path of travel of said heads at a subsequent indexing position of said turret, means for moving said rollers down toward a head at said position axially thereof to cause them to engage portions of said glass collar inside and outside of said tube respectively, means for moving said rollers toward each other to compress said collar portions against said tube, a body having a flat surface disposed above said head adjacent said rollers, and means for lowering said body to engage the rim of said glass collar to flatten out said rim so that the surface thereof is in a plane substantially perpendicular to the axis of the metal tube.

FRANK J. MALLOY.